United States Patent
Vervaart

(10) Patent No.: US 10,715,032 B2
(45) Date of Patent: Jul. 14, 2020

(54) CIRCUIT FOR CHARGING AN ELECTRIC BATTERY BY MEANS OF A PHOTOVOLTAIC MODULE

(71) Applicant: Commissariat à l'Energie Atomique et aux Energies Alternatives, Paris (FR)

(72) Inventor: Mark Vervaart, Mery (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/201,292

(22) Filed: Nov. 27, 2018

(65) Prior Publication Data

US 2019/0173376 A1 Jun. 6, 2019

(30) Foreign Application Priority Data

Dec. 1, 2017 (FR) ...................... 17 61509

(51) Int. Cl.
| | |
|---|---|
| *H02J 7/00* | (2006.01) |
| *H01M 10/44* | (2006.01) |
| *H01M 10/46* | (2006.01) |
| *H02M 1/36* | (2007.01) |
| *H02M 1/32* | (2007.01) |
| *H02J 7/35* | (2006.01) |
| *H02M 3/156* | (2006.01) |

(52) U.S. Cl.
CPC ............. *H02M 1/36* (2013.01); *H02J 7/0029* (2013.01); *H02J 7/35* (2013.01); *H02M 1/32* (2013.01); *H02M 3/156* (2013.01); *H02J 2207/20* (2020.01)

(58) Field of Classification Search
CPC .......... H02M 1/36; H02M 1/32; H02M 3/156; H02J 7/35; H02J 7/0029; H02J 2007/0059
USPC .................... 320/101, 135–136, 162–164
See application file for complete search history.

(56) References Cited

U.S. PATENT DOCUMENTS

| 10,511,162 B2 * | 12/2019 | Li .......................... B60L 58/20 |
| 2013/0257409 A1 | 10/2013 | Komiya |
| 2015/0263621 A1 | 9/2015 | Yu et al. |

(Continued)

FOREIGN PATENT DOCUMENTS

EP     3247014 A1     11/2017

OTHER PUBLICATIONS

Preliminary Search Report for French Application No. 1761509 dated Jun. 19, 2018, 2 pages.

*Primary Examiner* — Nghia M Doan
(74) *Attorney, Agent, or Firm* — Moreno IP Law LLLC

(57) ABSTRACT

The invention concerns a circuit for charging a battery by means of a photovoltaic module, including: input and output terminals intended to be respectively coupled to the module and to the battery; a converter including input and output terminals respectively coupled to the input and output terminals of the charging circuit; a control circuit including power supply terminals coupled to the output terminals of the charging circuit; a switch coupling one of the output terminals of the converter to one of the output terminals of the charging circuit; and a detection circuit configured, when the voltage between output terminals of the charging circuit exceeds a threshold, to send an order to turn off the switch and stop the converter for a predetermined period.

10 Claims, 2 Drawing Sheets

(56) References Cited

U.S. PATENT DOCUMENTS

2017/0155274 A1* 6/2017 Cher ................. H02S 40/38
2018/0281994 A1* 10/2018 De Payrebrune ....... H02S 40/44

\* cited by examiner

CIRCUIT FOR CHARGING AN ELECTRIC BATTERY BY MEANS OF A PHOTOVOLTAIC MODULE

CROSS-REFERENCE TO RELATED APPLICATION

This application claims the priority benefit of French patent application number 17/61509, the content of which is hereby incorporated by reference in its entirety to the maximum extent allowable by law.

FIELD

The present disclosure relates to a circuit for charging an electric battery by means of a photovoltaic module. It more particularly aims at a charging circuit protected against an untimely disconnection of the battery.

BACKGROUND

There exist many applications, for example, individual lighting systems, where a rechargeable electric battery is charged by means of a photovoltaic module.

Conventionally, a circuit for charging an electric battery by means of a photovoltaic module comprises:

a DC/DC switched-mode power converter having input terminals coupled to the terminals of the photovoltaic module and output terminals coupled to the terminals of the battery; and a control circuit capable of controlling the switched-mode power converter to transfer electric power from its input terminals to its output terminals, that is, from the photovoltaic module to the battery, to charge the battery.

Generally, the control circuit is coupled across the battery for its power supply.

A problem which is posed is that when the battery is untimely disconnected, that is, while the photovoltaic module is still connected to the input of the charging circuit and the control circuit is active, that is, it controls the switched-mode power converter to transfer electric power from its input terminal to its output terminals, there exists a high risk of destruction of the charging circuit, and in particular of the switched-mode power converter control circuit.

To limit this risk, manufacturers of this type of charging circuits advocate never disconnecting the electric battery from the charging circuit without having previously disconnected the photovoltaic module.

There however always remains a risk for such a recommendation not to be followed by the user.

It would thus be desirable to have a circuit for charging an electric battery by means of a photovoltaic module, the circuit being intrinsically protected against an untimely disconnection of the battery.

SUMMARY

Thus, an embodiment provides a circuit for charging an electric battery by means of a photovoltaic module, comprising: first and second input terminals intended to be respectively coupled to first and second terminals of the photovoltaic module; first and second output terminals intended to be respectively coupled to first and second terminals of the battery; a switched mode power converter comprising first and second input terminals respectively coupled to the first and second input terminals of the charging circuit and first and second output terminals respectively coupled to the first and second output terminals of the charging circuit; a circuit for controlling the charging circuit; a circuit for controlling the switched-mode power converter, comprising first and second power supply terminals respectively coupled to the first and second output terminals of the charging circuit; a protection switch coupling the first output terminal of the switched-mode power converter to the first output terminal of the charging circuit; and an overvoltage detection circuit configured to, when the voltage between the first and second output terminals of the charging circuit exceeds a threshold, send an order to turn off the protection switch and stop the switched-mode power converter for a predetermined inhibition period.

According to an embodiment, the overvoltage detection circuit is further configured to, at the end of the inhibition period, send an order to turn on the protection switch and restart the switched-mode power converter.

According to an embodiment, the control circuit is configured to control the switched-mode power converter according to the voltage and/or to the output current of the photovoltaic module, measured on the first and/or second input terminals of the charging circuit.

According to an embodiment, the control circuit is configured to automatically adapt the control of the switched-mode power converter to maximize the output power of the photo-voltaic module.

According to an embodiment, the overvoltage detection circuit comprises a comparator having its output coupled to a node for charging a timer circuit via a diode.

According to an embodiment, the timer circuit comprises a first capacitor and a first resistor coupled in parallel between the charging node of the timer circuit and the second output terminal of the charging circuit.

According to an embodiment, the overvoltage detection circuit comprises a Zener diode series-coupled with a second resistor between the first and second output terminals of the charging circuit, the comparator having a positive input terminal coupled to the junction point of the Zener diode and of the second resistor and a negative input terminal coupled to a node of application of a reference voltage.

According to an embodiment, the overvoltage detection circuit further comprises a resistive voltage dividing bridge comprising a third resistor in series with a fourth resistor between the first and second output terminals of the charging circuit, the node of application of the reference voltage being coupled to the junction point of the third and fourth resistors.

According to an embodiment, the charging node of the timer circuit is coupled to a control terminal of the protection switch and to a control terminal of the circuit for controlling the switched-mode power converter.

Another embodiment provides a system comprising a photovoltaic module, an electric battery, and the above-mentioned charging circuit, wherein the first and second input terminals of the charging circuit are respectively coupled to first and second terminals of the photovoltaic module, and wherein the first and second output terminals of the charging circuit are respectively coupled to first and second terminals of the battery.

The foregoing and other features and advantages will be discussed in detail in the following non-limiting description of specific embodiments in connection with the accompanying drawings.

DETAILED DESCRIPTION OF THE PRESENT EMBODIMENTS

Figure 1:
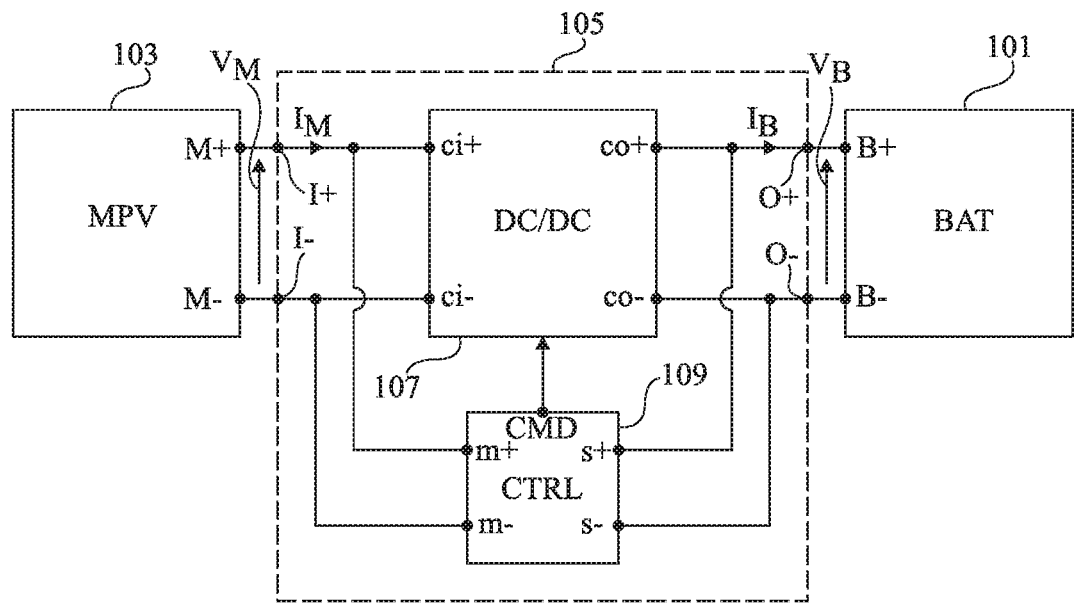
FIG. 1 is a simplified electric diagram illustrating in the form of blocks an example of a system for charging an electric battery by means of a photovoltaic module.

The same elements have been designated with the same reference numerals in the different drawings. For clarity, only those steps and elements which are useful to the understanding of the described embodiments have been shown and are detailed. In particular, the various uses which may be made of the described charging circuits have not been detailed, the described embodiments being compatible with usual applications of a circuit for charging an electric battery by means of a photovoltaic module. Further, in the described examples of charging circuits, the forming of the switched-mode power converter control circuit has not been detailed, the forming of this circuit being within the abilities of those skilled in the art based on the functional indications of the present description. The control circuit may for example be formed in analog electronics and/or in digital electronics, for example, by means of a microcontroller. In the present description, the term "connected" will be used to designate a direct electric connection, with no intermediate electronic component, for example, by means of a conductive track, and the term "coupled" or "linked" will be used to designate either a direct electric connection (then meaning "connected") or a connection via one or a plurality of intermediate components (resistor, capacitor, inductance, etc.). The terms "approximately", "substantially", and "in the order of" are used herein to designate a tolerance of plus or minus 10%, preferably of plus or minus 5%, of the value in question.

FIG. 1 is a simplified electric diagram illustrating in the form of blocks an example of a system for charging an electric battery 101 (BAT) by means of a photovoltaic module 103 (MPV).

Battery 101 comprises one or a plurality of elementary rechargeable electric power storage cells (not detailed) coupled in series and/or in parallel between a positive terminal B+ and a negative terminal B− of the battery.

Photovoltaic module 103 comprises one or a plurality of elementary photovoltaic cells (not detailed) coupled in series and/or in parallel between a positive terminal M+ and a negative terminal M− of the module.

The system of FIG. 1 comprises a charging circuit 105 comprising input terminals I+ and I− coupled, for example, connected, respectively to output terminals M+ and M− of module 103, and output terminals O+ and O− coupled, for example, connected, respectively to terminals B+ and B− of the battery.

Charging circuit 105 comprises a DC/DC switched-mode power converter 107 comprising input terminals ci+ and ci− coupled, for example, connected, respectively to input terminals I+ and I− of charging circuit 105, and output terminals co+ and co− coupled, for example, connected, respectively to output terminals O+ and O− of charging circuit 105. Switched-mode power converter 107 comprises one or a plurality of cut-off switches (not shown in FIG. 1) controllable to transfer electric power from its input terminals ci+ and ci− to output terminals co+ and co− of the converter).

Charging circuit 105 further comprises a control circuit 109 (CTRL) capable of controlling the cut-off switches of converter 107 to control the electric power transfer between input terminals ci+ and ci− and output terminals co+ and co− of the converter. Control circuit 109 comprises, in particular, one or a plurality of control terminals CMD coupled to the respective gates of the cut-off switches of converter 107.

In operation, control circuit 109 draws its power supply from battery 101. To achieve this, circuit 109 comprises power supply terminals s+ and s− coupled, for example, connected, respectively to output terminals O+ and O− of charging circuit 105.

In the example of FIG. 1, control circuit 109 is capable of controlling converter 107 according to the output voltage and/or current of photovoltaic module 103. To achieve this, control circuit 109 comprises measurement terminals m+ and m− coupled, for example, connected, respectively to input terminals I+ and I− of the charging circuit. As an example, circuit 109 is capable of automatically searching for the maximum power point of photovoltaic module 103, which particularly depends on the irradiation level of the module. To achieve this, circuit 109 automatically adapts the frequency and/or the duty cycle of the cut-off switches of converter 107 according to voltage and/or current measurements performed via its terminals m+ and m−, to permanently place the photovoltaic module at closest to its maximum power point, that is, to maximize the output power (that is, the product of the output current by the output voltage) of the photovoltaic module.

In steady state, photovoltaic module 103 supplies, between its terminals M+ and M−, a DC current $I_M$ under a DC voltage $V_M$, and battery 101 receives, between its terminals B+ and B−, a DC current $I_B$ under a DC voltage $V_B$. The DC/DC conversion of voltage $V_M$ into voltage $V_B$ and of current $I_M$ into current $I_B$ is ensured by switched-mode power converter 107.

Figure 2:
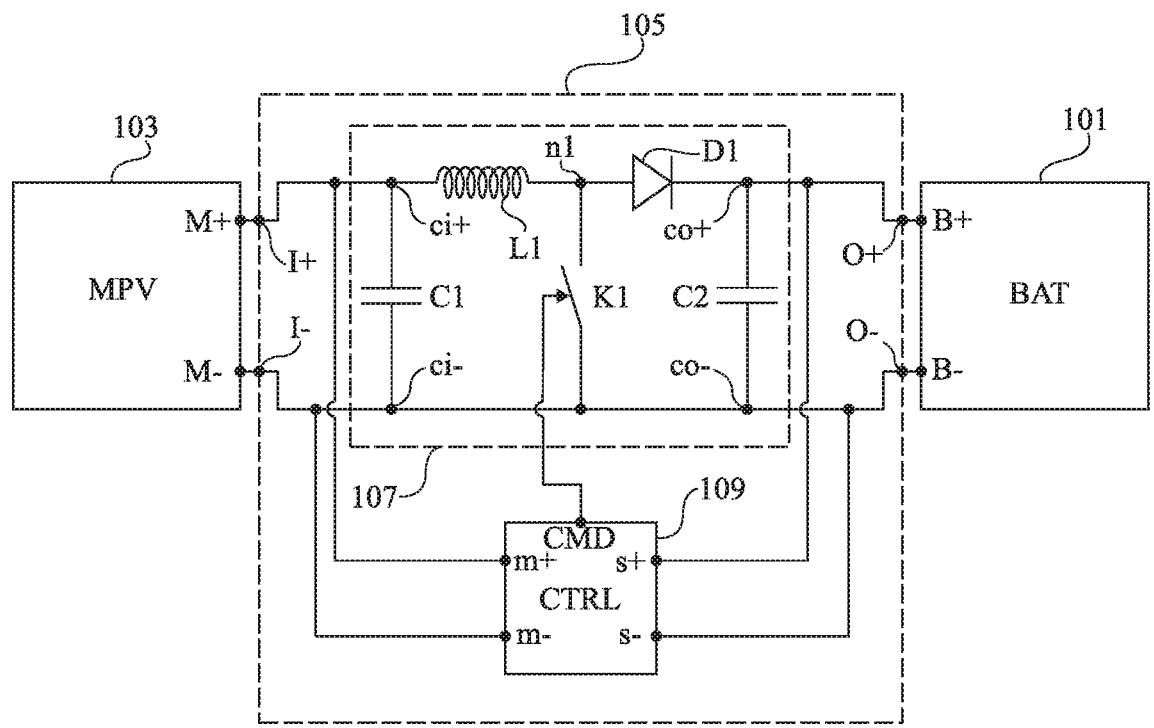
FIG. 2 is an electric diagram illustrating in further detail an embodiment of a switched-mode power converter of the system of FIG. 1.

FIG. 2 shows the elements of FIG. 1 and illustrates in further detail an embodiment of the switched-mode power converter 107 of charging circuit 105.

In this example, converter 107 is a voltage boost converter. It comprises an inductance L1 having a first end coupled, for example, connected, to input node ci+ of the converter, and a second end coupled, for example, connected, to an intermediate node n1 of the converter. The converter further comprises a cut-off switch K1, for example, an N-channel MOS transistor, having a first conductive node coupled, for example, connected, to node n1 and a second conduction node coupled, for example, connected, to input node ci− of the converter. Control output terminal CMD of control circuit 109 is coupled, for example, connected, to a control terminal of switch K1. In this example, input node ci− and output node co− of the converter are connected. Converter 107 further comprises a diode D1 having its anode coupled, for example, connected, to node n1 and having its cathode coupled, for example, connected, to output node co+ of the converter. The converter 107 of FIG. 2 further comprises an input capacitor C1 having its electrodes coupled, for example, connected, respectively to input terminals ci+ and ci− of the converter, and an output capacitor C2 having its electrodes coupled, for example, connected, respectively to output terminals co+ and co− of the converter.

In operation, control circuit 109 regulates the frequency and/or the duty cycle of switching of switch K1 to control the electric power transfer between photovoltaic module 103 and battery 101.

More generally, the charging circuit of FIG. 1 is compatible with most known DC/DC switched-mode power converter architectures. As an example, switched-mode converter 107 may be a voltage buck converter, for example comprising the same elements as in the example of FIG. 2, but where switch K1 and inductance L1 are series-coupled between terminal ci+ and co+ of the converter, and wherein diode D1 is coupled, by its anode, to terminal ci− and co− of the converter and, by its cathode, to the junction point of switch K1 and inductance L1.

A problem which is posed in a system of the type de-scribed in relation with FIGS. 1 and 2 is that, due to the presence of various capacitive elements in charging circuit 105 (and particularly of output capacitor C2 in the example of FIG. 2), the stopping of the operation of control circuit 109 is not instantaneous in case of a disconnection of battery 101. In other switches, when battery 101 is disconnected from charging circuit 105, control circuit 109 keeps on controlling the switching of the cut-off switch(es) of converter 107 for a relaxation period corresponding to the time of discharge of the stray capacitor seen between the power supply terminals s+ and s− of circuit 109. As an example, the duration of the relaxation period may be in the range from a plurality of milliseconds to several hundred milliseconds, during which control circuit 109 keeps on controlling switched-mode power converter 107 to transfer electric power from its input terminals ci+ and ci− to its output terminals co+ and co−. If photovoltaic module 103 has been previously disconnected from the charging circuit, the output stray capacitance of the charging circuit discharges until it causes the stopping of the operation of control circuit 109, and thus of switched-mode power converter 107, when circuit 109 is no longer powered. If, however, photovoltaic module 103 has not been disconnected, electric power generated by module 103 keeps on being transferred to the output of switched-mode power converter 107 during the relaxation period. As a result, the output stray capacitance of the charging circuit does not discharge. Due to the absence of battery 101 to absorb the output current IB of converter 107, the output voltage of the charging circuit then very rapidly increases, until the destruction of control circuit 109 and/or of switched-mode power converter 107.

Figure 3:
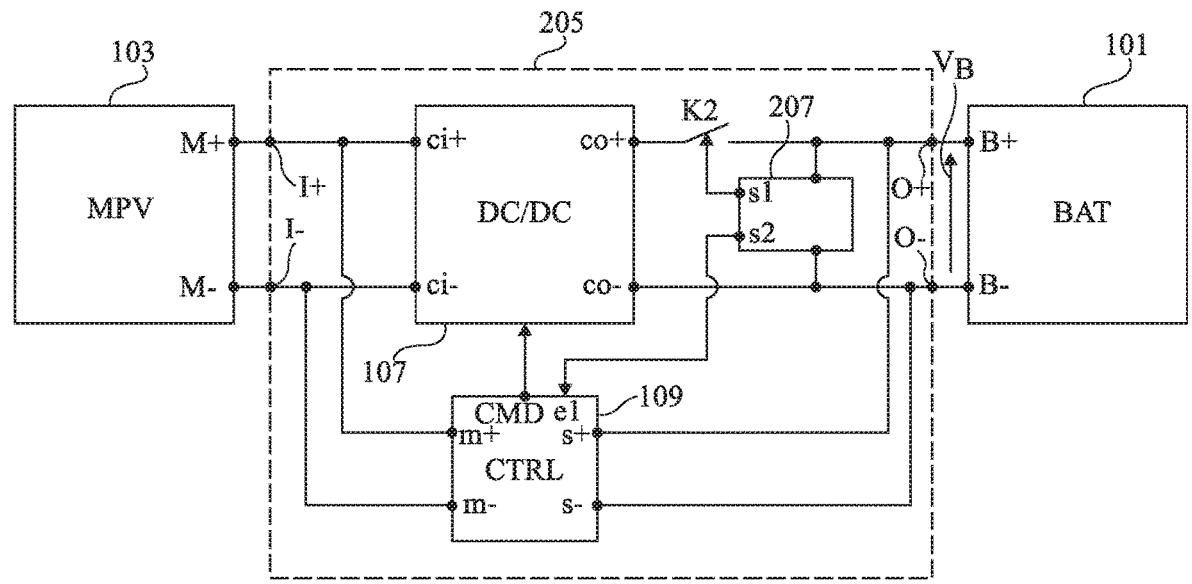
FIG. 3 is a simplified electric diagram illustrating in the form of blocks an embodiment of a system for charging an electric battery by means of a photovoltaic module.

FIG. 3 is a simplified electric diagram illustrating in the form of blocks an embodiment of a system for charging an electric battery 101, for example, identical or similar to battery 101 of FIGS. 1 and 2, by means of a photovoltaic module 103, for example, identical or similar to module 103 of FIGS. 1 and 2.

The system of FIG. 3 comprises a charging circuit 205. Charging circuit 205 comprises the same elements as charging circuit 105 of FIG. 1, arranged substantially in the same way.

The charging circuit 205 of FIG. 3 further comprises a switch K2 having a first conduction node coupled, for example, connected, to output node co+ of switched-mode power converter 107, and a second conduction node coupled, for example, connected, to output node O+ of charging circuit 205. In other words, in the example of FIG. 3, power supply terminal s+ of control circuit 109 is separated from output terminal co+ of switched-mode power converter 107 by switch K2.

The charging circuit 205 of FIG. 3 further comprises an overvoltage detection circuit 207 connected to output nodes O− and O+ of the charging circuit. Circuit 207 is capable of detecting that a predefined threshold $V_{TH}$ has been exceeded by voltage $V_B$ between terminals O− and O+ of charging circuit and, when an exceeding of threshold $V_{TH}$ is detected, controlling the turning off of switch K2 and the stopping of the switched-mode power converter during a predetermined inhibition period $T_{inh}$. Threshold $V_{TH}$ is selected to be greater than the maximum nominal voltage $VBAT_{MAX}$ of battery 101, for example, in the range from 1.01 to 1.2 times voltage $VBAT_{MAX}$.

In the shown example, detection circuit 207 comprises a first output terminal s1 coupled, for example, connected, to a control terminal of switch K2, and a second output terminal s2 coupled, for example, connected, to an input terminal e1 of control circuit 109. When voltage VB between output terminals O+ and O− of the charging circuit exceeds threshold VTH, circuit 207 applies, during a continuous period $T_{inh}$ starting from the detection of the overvoltage, on its terminal s1, a signal for controlling the turning off of switch K2 and, on its terminal s2, a signal for controlling the deactivation of the switched-mode power converter. Thus, during period Tinh, switch K2 is maintained off, insulating output terminal co+ of converter 107 of output terminal O+ of the charging circuit, and the switching of the cut-off switches of converter 107 is interrupted, stopping the electric power transfer from input terminals ci+ and ci− to output terminals co+ and co− of the converter.

Inhibition period $T_{inh}$ is selected to be greater than the relaxation period corresponding to the time of discharge of the stray capacitance between power supply terminals s+ and s− of circuit 109. As an example, period $T_{inh}$ is in the range from 10 to 1,000 milliseconds, for example, from 100 to 500 milliseconds, for example, in the order of 300 milliseconds.

If the overvoltage detected by circuit 207 results from an untimely disconnection of battery 101, with no prior disconnection of photovoltaic module 103, the provision of inhibition period $T_{inh}$ leaves time to the output stray capacitances of charging circuit 205 to discharge. At the end of inhibition period $T_{inh}$, circuit 207 supplies, on its terminal s1, a signal for controlling the tuning on of switch K2 and, on its terminal s2, a signal for controlling the reactivation of the switched-mode power converter. However, since battery 101 is no longer present and the output stray capacitances of circuit 205 is discharged, the control circuit 109 of the switched-mode power converter is no longer powered (voltage $V_B$ substantially equal to zero). Thus, the operation of the switched-mode power converter remains interrupted until battery 101 is possibly connected back.

If the overvoltage detected by circuit 207 results from another cause such as, for example, a lightning impact on the photovoltaic module, the operation of the charging circuit is normally resumed at the end of inhibition period $T_{inh}$, provided for voltage $V_B$ between terminals O+ and O− of the charging circuit to have fallen back under thresholds $V_{TH}$ at the end of period $T_{inh}$.

Thus, the charging circuit 205 of FIG. 3 is intrinsically protected against a possible disconnection of the battery and its operation will not be durably interrupted in the occurrence of an overvoltage due to a cause other than a disconnection of the battery.

Figure 4:
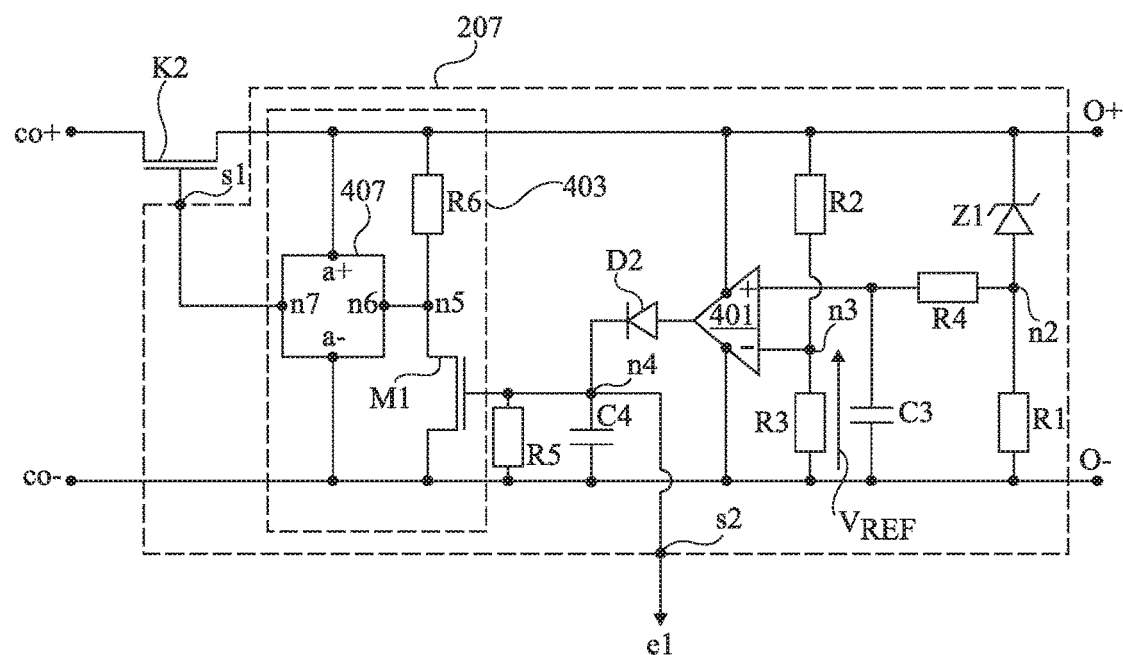
FIG. 4 is a simplified electric diagram illustrating in further detail an embodiment of a portion of the system of FIG. 3.

FIG. 4 is a more detailed electric diagram illustrating an embodiment of overvoltage detection circuit 207 and of switch K2 of the charging circuit 205 of FIG. 3.

In this example, switch K2 is an N-channel MOS transistor having its gate connected to output node s1 of circuit 207 and having its conduction nodes (source and drain)

respectively connected to output terminal co+ of converter 107 and to output terminal O+ of charging circuit 205.

Circuit 207 comprises a Zener diode Z1 series-coupled with a resistor R1 between output terminals O+ and O− of charging circuit 205. More particularly, in this example, Zener diode Z1 has its cathode coupled, for example, connected, to node O+ and its anode coupled, for example, connected, to an intermediate node n2 of circuit 207, and resistor R1 has a first end coupled, for example, connected, to node n2 and a second end coupled, for example, connected, to terminal O−.

Circuit 207 further comprises a voltage comparator 401 having a positive input terminal (+) coupled to node n2 and having a negative input terminal (−) coupled to a node n3 of application of a reference potential. The power supply terminals of comparator 401 are coupled, for example, connected, respectively to output terminals O+ and O− of the charging circuit.

In this example, the reference potential on node n3 is supplied by a voltage dividing bridge comprising a resistor R2 in series with a resistor R3 between output terminals O+ and O− of the charging circuit. More particularly, in this example, resistor R2 has a first end coupled, for example, connected, to node O+, and a second end coupled, for example, connected, to node n3, and resistor R3 has a first end coupled, for example, connected, to node n3, and a second end coupled, for example, connected, to node O−.

In the shown example, circuit 207 further comprises an optional circuit for stabilizing the voltage applied to the positive input terminal (+) of the comparator, comprising a resistor R4 coupling node n2 to the positive input (+) of comparator 401, and a capacitor C3 coupling the positive input (+) of comparator 401 to terminal O−.

Circuit 207 further comprises a diode D2 having its anode coupled, for example, connected, to the output of comparator 401, and having its cathode coupled, for example, connected, to an intermediate node n4 of circuit 207.

Circuit 207 further comprises a timing circuit comprising a capacitor C4 having a first electrode coupled, for example, connected, to node n4 and a second electrode coupled, for example, connected, to terminal O− and, in parallel with capacitor C4, a resistor R5 having a first end coupled, for example, connected, to node n4, and a second end coupled, for example, connected, to terminal O−.

In this example, output node s2 is coupled, for example, connected, to node n4.

Circuit 207 of FIG. 4 further comprises a circuit 403 for controlling switch K2. Circuit 403 comprises a resistor R6 in series with an N-channel MOS transistor M1 between terminals O+ and O− of the charging circuit. In the shown example, resistor R6 has a first end coupled, preferably connected, to terminal O+, and a second end coupled, for example, connected, to an intermediate node n5 of circuit 403, and transistor M1 has a first conduction node coupled, for example, connected, to node n5 and a second conduction node coupled, for example, connected, to terminal O−. The gate of transistor M1 is coupled, for example, connected, to node n4. Control circuit 403 further comprises a charge pump circuit 407 (not detailed) comprising power supply nodes a+ and a− coupled, for example, connected, respectively to terminals O+ and O− of the charging circuit, an input node n6 coupled, for example, connected, to node n5, and an output node n7 coupled, for example, connected, to node s1.

The operation of overvoltage detection circuit 207 of FIG. 4 will now be described. It is considered in this example that terminals co− and O− are connected to a same node of application of a reference potential, for example, the ground, with respect to which all the circuit voltages are defined.

In steady state, when voltage $V_B$ between terminals O+ and O− of the charging circuit is lower than avalanche threshold $V_{Z1}$ of Zener diode Z1, diode Z1 is blocked and the voltage on node n2 (referenced with respect to terminal O−) is substantially zero. As a result, the output voltage of comparator 401 is in a low state (substantially zero). Thus, the voltage on node n4 is substantially zero. Signal s2 is thus in a low state, interpreted by control circuit 109 as a state of control to the active state of switched-mode power converter 107. Transistor M1 is maintained off, so that the voltage on node n5 is in a high state (substantially equal to the voltage on node O+), interpreted by control circuit 407 as being a signal for controlling switch K2 to the on state. Circuit 407 thus applies on node s1 a signal for maintaining transistor K2 in the on state, that is, a voltage greater than the source voltage of transistor K2.

When voltage $V_B$ between terminals O+ and O− of the charging circuit exceeds avalanche threshold $V_{Z1}$ of Zener diode Z1, diode Z1 starts conducting, causing an increase in the voltage on node n2. When the voltage on node n2 exceeds threshold $V_{REF}$ applied to node n3, the output voltage of comparator 401 switches to the high state (substantially equal to the voltage on terminal O+). This causes the rapid charge, via diode D2, of capacitor C4, marking the beginning of period $T_{inh}$ of inhibition of the switched-mode power converter. Capacitor C4 then slowly discharges via resistor R5, time constant R5×C4 setting the duration of period $T_{inh}$. During period $T_{inh}$, the voltage on node n4 is in a high state. Signal s2 is thus in a high state, interpreted by control circuit 109 as a state of control to the inactive state of switched-mode power converter 107. Transistor M1 is maintained on, so that the voltage on node n5 is in a low state (substantially equal to the voltage on node O−), interpreted by control circuit 407 as being a signal for setting switch K2 to the off state. Circuit 407 thus applies on node s1 a signal for maintaining transistor K2 in the off state. It should be noted that in this example, overvoltage threshold $V_{TH}$ causing the turning off of switch K2 and the stopping of the switched-mode power converter is substantially equal to $V_{Z1}+V_{REF}$. As an example, value $V_{REF}$, set by the values of resistors R2 and R3, is in the range from 0.1 to 1 V, for example, in the order of 0.2 V.

It should be noted that in the example of FIG. 4, switch K2 is an N-channel MOS transistor. An advantage of such a switch is that it generates relatively low conduction losses as compared with a P-channel MOS transistor. However, as a counterpart, its control is more complex to implement since it requires the application on its gate of a voltage greater than the voltage present on terminal O+ of the charging circuit (to maintain switch K2 in the on state).

As a variation, switch K2 may be replaced with a P-channel MOS transistor, in which case control circuit 403 may be omitted and the gate of transistor K2 may be directly connected to node n4.

More generally, any other switch controllable to be turned off and to be turned on may be used to form switch K2.

Specific embodiments have been described. Various alterations, modifications, and improvements will occur to those skilled in the art. In particular, the described embodiments are not limited to the specific embodiment of the overvoltage detection circuit 207 described in relation with FIG. 4. More generally, it will be within the abilities of those skilled in the art, based on the functional indications of the present disclosure, to provide other ways to form circuit 207, in analog electronics and/or in digital electronics (for example, by means of a microcontroller).

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A circuit for charging an electric battery by means of a photovoltaic module, comprising:
   first and second input terminals intended to be respectively coupled to first and second terminals of the photovoltaic module;
   first and second output terminals intended to be respectively coupled to first and second terminals of the battery;
   a switched-mode power converter comprising first and second input terminals respectively coupled to the first and second input terminals of the charging circuit and first and second output terminals respectively coupled to the first and second output terminals of the charging circuit;
   a circuit for controlling the switched-mode power converter comprising first and second power supply terminals respectively coupled to the first and second output terminals of the charging circuit;
   a protection switch coupling the first output terminal of the switched-mode power converter to the first output terminal of the charging circuit; and
   an overvoltage detection circuit configured to, when the voltage between the first and second output terminals of the charging circuit exceeds a threshold, send a command to turn off the protection switch and stop the switched-mode power converter for a predetermined inhibition period.

2. The charging circuit of claim 1, wherein the overvoltage detection circuit is further configured to, at the end of the inhibition period, send a command to turn on the protection switch and restart the switched-mode power converter.

3. The charging circuit of claim 1, wherein the control circuit is configured to control the switched-mode power converter according to the output voltage and/or current of the photovoltaic module, measured on the first and/or second input terminals of the charging circuit.

4. The charging circuit of claim 3, wherein the control circuit is configured to automatically control the switched-mode power converter to maximize the output power of the photovoltaic module.

5. The charging circuit of claim 1, wherein the overvoltage detection circuit comprises a comparator having its output coupled to a charging node of a timer circuit via a diode.

6. The charging circuit of claim 5, wherein the timer circuit comprises a first capacitor and a first resistor coupled in parallel between the charging node of the timer circuit and the second output terminal of the charging circuit.

7. The charging circuit of claim 5, wherein the overvoltage detection circuit comprises a Zener diode series-coupled with a second resistor between the first and second output terminals of the charging circuit, the comparator having a positive input terminal coupled to the junction point of the Zener diode and of the second resistor and a negative input terminal coupled to a node of application of a reference voltage.

8. The charging circuit of claim 7, wherein the overvoltage detection circuit further comprises a resistive voltage dividing bridge comprising a third resistor in series with a fourth resistor between the first and second output terminals of the charging circuit, the node of application of the reference voltage being coupled to the junction point of the third and fourth resistors.

9. The charging circuit of claim 5, wherein the charging node of the timer circuit is coupled to a control terminal of the protection switch and to a control terminal of the circuit for controlling the switched-mode power converter.

10. A system comprising a photovoltaic module, an electric battery, and the charging circuit of claim 1, wherein the first and second input terminals of the charging circuit are respectively coupled to first and second terminals of the photovoltaic module, and wherein the first and second output terminals of the charging circuit are respectively coupled to first and second terminals of the battery.

* * * * *